United States Patent

Sano

(10) Patent No.: US 9,912,828 B2
(45) Date of Patent: Mar. 6, 2018

(54) IMAGE READING APPARATUS AND SEMICONDUCTOR DEVICE

(71) Applicant: SEIKO EPSON CORPORATION, Tokyo (JP)

(72) Inventor: Takafumi Sano, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/361,884

(22) Filed: Nov. 28, 2016

(65) Prior Publication Data

US 2017/0171419 A1    Jun. 15, 2017

(30) Foreign Application Priority Data

Dec. 14, 2015  (JP) ................................ 2015-243162

(51) Int. Cl.
| | |
|---|---|
| *H04N 1/04* | (2006.01) |
| *H04N 1/031* | (2006.01) |
| *H04N 1/028* | (2006.01) |
| *H04N 1/48* | (2006.01) |
| *H04N 5/374* | (2011.01) |

(Continued)

(52) U.S. Cl.
CPC ......... *H04N 1/031* (2013.01); *H04N 1/02835* (2013.01); *H04N 1/484* (2013.01); *H04N 5/3692* (2013.01); *H04N 5/374* (2013.01); *H04N 5/378* (2013.01); *H04N 2201/0081* (2013.01)

(58) Field of Classification Search
CPC ...... H04N 5/335; H04N 5/353; H04N 5/3698; H04N 5/343; H04N 5/23241; H04N 5/372; G06F 3/0412; G06F 3/0416; G06F 3/044; G06F 2203/04106; G06F 3/047
USPC ......... 358/482, 483; 250/208.1, 394, 370.09, 250/214 A, 366, 208.2, 214 P, 361 R, 250/370.08, 395; 348/300, 308, 294, 302, 348/296, 301, 306, 76; 901/22
See application file for complete search history.

(56) References Cited

U.S. PATENT DOCUMENTS

| | | | | |
|---|---|---|---|---|
| 4,729,038 A | * | 3/1988 | Miura ................ | G06K 15/1276 347/247 |
| 4,763,241 A | * | 8/1988 | Egawa ............... | G03G 15/0152 347/132 |

(Continued)

FOREIGN PATENT DOCUMENTS

JP            05-207375 A      8/1993

*Primary Examiner* — Negussie Worku
(74) *Attorney, Agent, or Firm* — Global IP Counselors, LLP

(57) ABSTRACT

An image reading apparatus includes a light receiving element configured to receive light from an image to perform photoelectric conversion, an amplification unit configured to amplify a signal generated by the photoelectric conversion, a switch element electrically connected to first and second ends of the amplification unit to be in parallel with the amplification unit, and a capacitor. The capacitor is electrically connected to the first and second ends of the amplification unit to be in parallel with to the amplification unit, and includes a first wire electrically connecting a first end of the light receiving element, the first end of the amplification unit, and a first end of the switch element, and a second wire electrically connecting the second end of the amplification unit and a second end of the switch element. The capacitor includes capacitance that is interconnect capacitance between the first and second wires.

9 Claims, 11 Drawing Sheets

(51) Int. Cl.
 *H04N 5/369* (2011.01)
 *H04N 5/378* (2011.01)

(56) References Cited

U.S. PATENT DOCUMENTS

| | | | | |
|---|---|---|---|---|
| 5,322,994 | A * | 6/1994 | Uno | H03F 3/082 |
| | | | | 250/208.1 |
| 6,222,581 | B1 * | 4/2001 | Fujimoto | H04N 1/024 |
| | | | | 347/241 |
| 2010/0238334 | A1 * | 9/2010 | Takahashi | H01L 27/14632 |
| | | | | 348/305 |
| 2016/0167368 | A1 * | 6/2016 | Sano | B41J 2/04586 |
| | | | | 347/14 |
| 2016/0167371 | A1 * | 6/2016 | Sano | B41J 2/14233 |
| | | | | 347/68 |
| 2017/0070691 | A1 * | 3/2017 | Nishikido | H04N 5/35581 |
| 2017/0171478 | A1 * | 6/2017 | Sano | H04N 1/031 |
| 2017/0229503 | A1 * | 8/2017 | Suzuki | H01L 27/14609 |

* cited by examiner

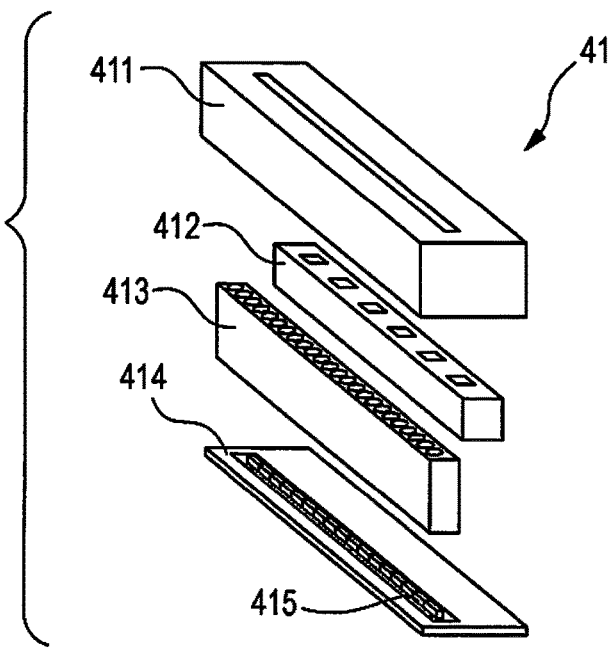
FIG. 3
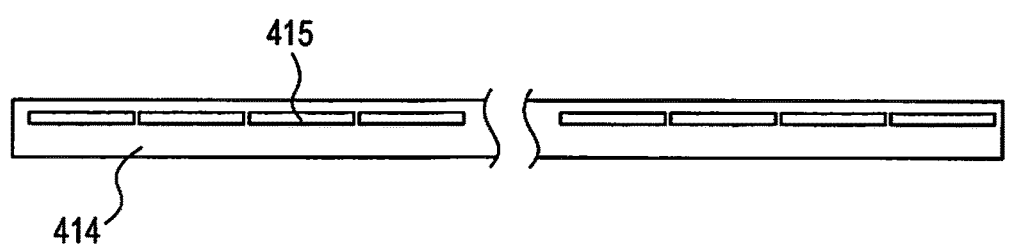
FIG. 4
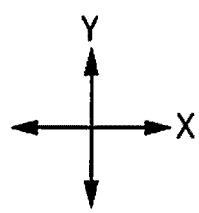

IMAGE READING APPARATUS AND SEMICONDUCTOR DEVICE

CROSS-REFERENCE TO RELATED APPLICATIONS

This application claims priority to Japanese Patent Application No. 2015-243162 filed on Dec. 14, 2015. The entire disclosure of Japanese Patent Application No. 2015-243162 is hereby incorporated herein by reference.

BACKGROUND

Technical Field

The present invention relates to an image reading apparatus and a semiconductor device.

Related Art

An image reading apparatus (scanner) using a contact image sensor, and a copying machine, a combined printer, or the like to which a printing function is added has been developed. As the contact image sensor used in the image reading apparatus, a configuration of using a photodiode which is provided on a semiconductor substrate is used.

For example, JP-A-5-207375 discloses a solid-state imaging element (imaging sensor) including a pixel (basic cell). The pixel includes a photodiode, a feedback capacitance element which accumulates photoelectric charges generated in the photodiode, an amplification circuit which uses an n-type MOS transistor, and a reset switching element for disconnecting an input terminal and an output terminal of the amplification circuit (source and drain of the n-type MOS transistor).

JP-A-5-207375 discloses that the capacitance value of the feedback capacitance element is decreased, and thus it is possible to improve sensitivity of a pixel. However, JP-A-5-207375 does not disclose details of a configuration of the feedback capacitance element or other elements for decreasing the capacitance value. That is, in the image reading apparatus (scanner) in the related art, a configuration of a pixel for improving the sensitivity in reading an image may be improved more.

SUMMARY

An advantage of some aspects of the invention is to provide an image reading apparatus which can read an image with high sensitivity. Another advantage of some aspects of the invention is to provide a semiconductor device which can have improved sensitivity.

The invention can be realized in the following aspects or application examples.

According to this application example, there is provided an image reading apparatus for reading an image. The image reading apparatus includes a light receiving element configured to receive light from the image so as to perform photoelectric conversion, an amplification unit which is electrically connected to the light receiving element, and is configured to amplify a signal generated by the photoelectric conversion, a switch element which is electrically connected to both first and second ends of the amplification unit so as to be in parallel with the amplification unit, and a capacitor which is electrically connected to both of the first and second ends of the amplification unit so as to be in parallel with the amplification unit. The capacitor includes a first wire and a second wire, the first wire electrically connects a first end of the light receiving element, the first end of the amplification unit, and a first end of the switch element, and the second wire electrically connects the second end of the amplification unit and a second end of the switch element. The capacitor includes capacitance that is interconnect capacitance between the first wire and the second wire.

According to the image reading apparatus of the application example, the capacitor which is connected in parallel to the amplification unit is realized by interconnect capacitance, and thus it is possible to reduce the capacitance value. Thus, according to the image reading apparatus of the application example, it is possible to improve sensitivity of an output signal of the amplification unit, and as a result, it is possible to read an image with high sensitivity.

According to the image reading apparatus of the application example, the capacitor which is connected in parallel to the amplification unit is realized by interconnect capacitance, and thus bias dependency is not provided. Accordingly, it is possible to improve linearity of an output voltage of the amplification unit, which depends on intensity of light received by the light receiving element.

In the image reading apparatus according to the application example, the first wire and the second wire constituting the capacitor may be disposed in the same wiring layer among a plurality of wiring layers disposed on a semiconductor substrate.

According to the image reading apparatus of the application example, the capacitor which is connected in parallel to the amplification unit is configured by the first wire and the second wire provided in the same wiring layer, and thus can be realized in a process included in a general manufacturing process. Thus, an additional process is not required, and an increase of cost is not required.

According to the image reading apparatus of the application example, the capacitor which is connected in parallel to the amplification unit may be disposed in a wiring layer higher than a layer in which various elements such as a MOS transistor and a resistor are formed, so as to overlap a region in which the element is formed. Thus, it is also effective in reducing a size of the circuit.

In the image reading apparatus according to the application example, the first wire may have a first comb-tooth shaped portion. The second wire may have a second comb-tooth shaped portion. The first comb-tooth shaped portion and the second comb-tooth shaped portion may be arranged so as to mesh with each other. The capacitor may include capacitance between the first comb-tooth shaped portion and the second comb-tooth shaped portion.

According to the image reading apparatus of the application example, an area of potions at which the first comb-tooth shaped portion and the second comb-tooth shaped portion face each other is increased. Thus, it is possible to realize the capacitor having a desired capacitance value, with a small area.

According to the image reading apparatus of the application example, it is possible to realize the capacitor which is connected in parallel to the amplification unit, with a small area, and thus it is possible to easily perform disposition so as to overlap a region in which various elements are formed. In addition, it is very effective in reducing a size of the circuit.

In the image reading apparatus according to the application example, the value of the capacitance may be an order of femto Farad.

According to the image reading apparatus of the application example, the capacitance value of the capacitor which is connected in parallel to the amplification unit is an appropriate value in a range which is not excessively narrow.

Thus, it is possible to achieve improvement of sensitivity, and reduction of sensitivity variation.

In the image reading apparatus according to the application example, the value of the capacitance may be more than a value of parasitic capacitance between the first wire and the second wire.

According to the image reading apparatus of the application example, the capacitance value of the capacitor which is connected in parallel to the amplification unit is more than the capacitance value of parasitic capacitance. Thus, it is possible to reduce variation of the capacitance value of feedback capacitance due to manufacturing variation of the parasitic capacitance. Thus, according to the image reading apparatus of the application example, it is possible to reduce sensitivity variation.

In the image reading apparatus according to the application example, the amplification unit may include an output terminal, a first transistor to which a signal generated by the photoelectric conversion is configured to be input, and a second transistor which electrically connects the first transistor and the output terminal. The first transistor and the second transistor may be cascode-connected.

According to the image reading apparatus of the application example, the first transistor and the second transistor are cascode-connected, and thus it is possible to reduce parasitic capacitance between an input and an output of the amplification unit. Thus, according to the image reading apparatus of the application example, because an increase of the feedback capacitance occurring by the parasitic capacitance is suppressed, it is possible to improve sensitivity of an output signal of the amplification unit, and as a result, it is possible to read an image with high sensitivity.

According to this application example, there is provided a semiconductor device which includes a light receiving element configured to receive light so as to perform photoelectric conversion, an amplification unit which is electrically connected to the light receiving element, and is configured to amplify a signal generated by the photoelectric conversion, a switch element which is electrically connected to both first and second ends of the amplification unit so as to be in parallel with the amplification unit, and a capacitor which is electrically connected to both of the first and second ends of the amplification unit so as to be in parallel with the amplification unit. The capacitor includes a first wire and a second wire, the first wire electrically connects a first end of the light receiving element, the first end of the amplification unit, and a first end of the switch element, and the second wire electrically connects the second end of the amplification unit and a second end of the switch element. The capacitor includes capacitance that is interconnect capacitance between the first wire and the second wire.

According to semiconductor device of the application example, the capacitor which is connected in parallel to the amplification unit is realized by interconnect capacitance, and thus it is possible to reduce the capacitance value. Thus, according to the semiconductor device of the application example, it is possible to improve the sensitivity of an output signal.

According to the semiconductor device of the application example, the capacitor which is connected in parallel to the amplification unit is realized by interconnect capacitance, and thus bias dependency is not provided. Accordingly, it is possible to improve linearity of an output voltage, which depends on intensity of light received by the light receiving element.

BRIEF DESCRIPTION OF THE DRAWINGS

Referring now to the attached drawings which form a part of this original disclosure:

FIG. 3 is an exploded perspective view schematically illustrating a configuration of an image sensor module;

FIG. 4 is a plan view schematically illustrating a disposition of an image reading chip;

DETAILED DESCRIPTION OF EXEMPLARY EMBODIMENTS

Hereinafter, a preferred exemplary embodiment according to the invention will be described in detail with reference to the drawings. The drawings are used for convenience of descriptions. The exemplary embodiment which will be described below does not unreasonably limit the details of aspects of the invention described in Claims. All components of a configuration which will be described below are not limited as necessary components for the aspect of the invention.

Hereinafter, a combined machine (combined device) 1 to which an image reading apparatus according to an aspect of the invention will be described in detail with reference to the accompanying drawings.

1. Structure of Combined Machine

Figure 1:
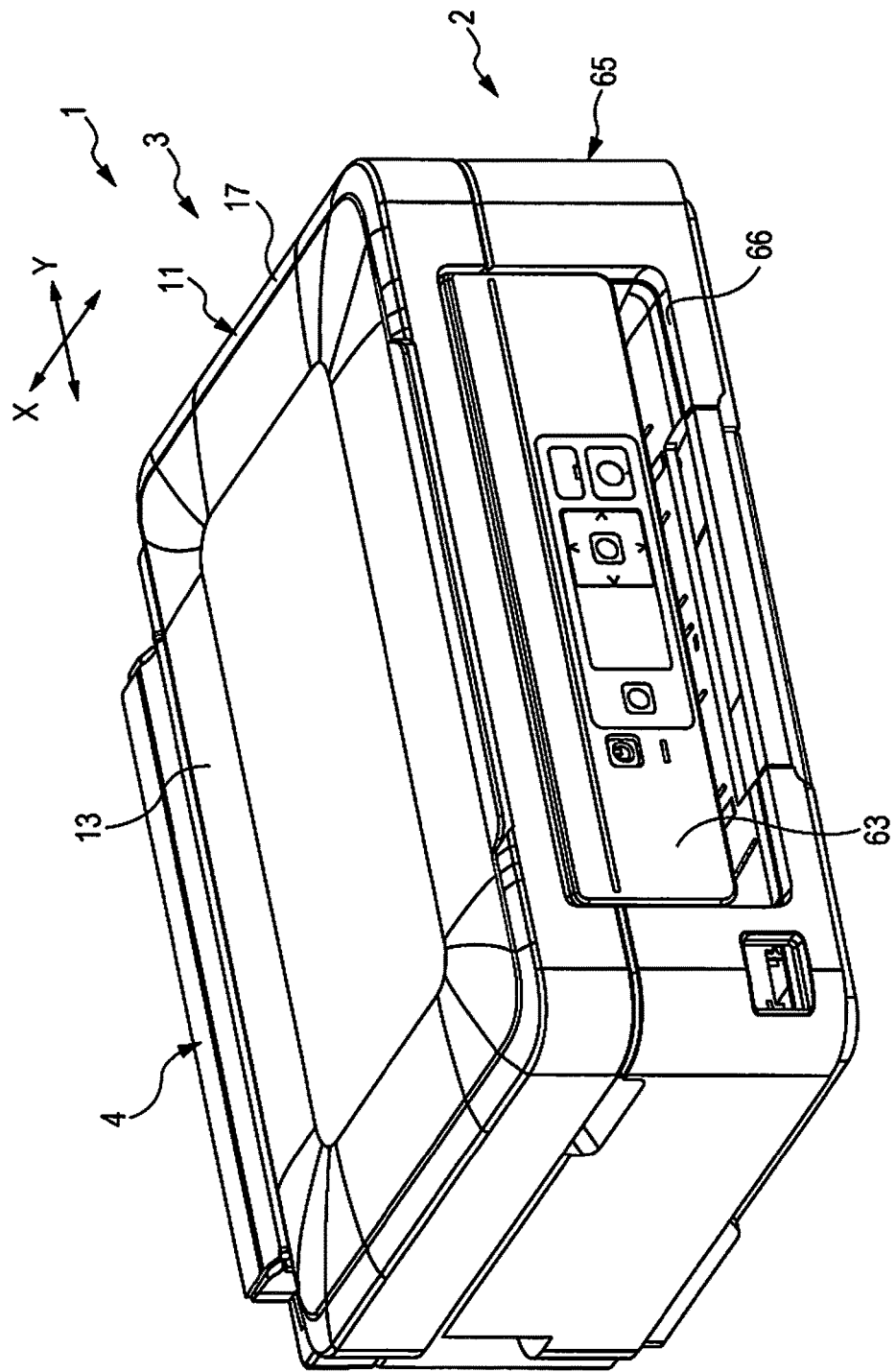
FIG. 1 is an external perspective view illustrating a combined machine according to an exemplary embodiment.

FIG. 1 is an external perspective view illustrating the combined machine 1. As illustrated in FIG. 1, the combined machine 1 integrally includes a printer unit (image recording device) 2 which corresponds to a device main body, and a scanner unit (image reading apparatus) 3. The scanner unit 3 corresponds to an upper unit which is disposed at an upper portion of the printer unit 2. Descriptions will be made on the assumption that a front-rear direction in FIG. 1 is an X axis direction and a crosswise direction is a Y axis direction.

As illustrated in FIG. 1, the printer unit 2 includes a transport unit (not illustrated), a print unit (not illustrated), an operation unit 63, a device frame (not illustrated), and a device housing 65. The transport unit sends a recording medium (print paper or cutform paper) corresponding to a sheet of paper, along a feeding path. The print unit is disposed over the feeding path, and performs printing on the recording medium in an ink jet manner. The operation unit 63 has a panel form, and is disposed on the front surface. In the device frame, the transport unit, the print unit, and the operation unit 63 are mounted. The device housing 65 covers the above components. An exit port 66 through which a recording medium on which printing is ended exits is provided on the device housing 65. Although not illustrated, a USB port and a power port are disposed at a lower portion of the rear surface. That is, the combined machine 1 is configured so as to be allowed to be connected to a computer and the like through the USB port.

The scanner unit 3 is supported so as to be revolvable around the printer unit 2 through the hinge portion 4 at a rear end portion. The scanner unit 3 covers an upper portion of the printer unit 2 so as to be freely opened or closed. That is, the scanner unit 3 is lifted in a revolving direction, and thus an upper-surface opening portion of the printer unit 2 is exposed, and the inside of the printer unit 2 is exposed through the opening portion on the upper-surface opening portion. The scanner unit 3 is pulled down in the revolving direction, and is mounted on the printer unit 2, and thus the upper-surface opening portion is closed by the scanner unit 3. In this manner, the scanner unit 3 is opened, and thus exchange of an ink cartridge, solving paper clogging, or the like can be performed.

Figure 2:
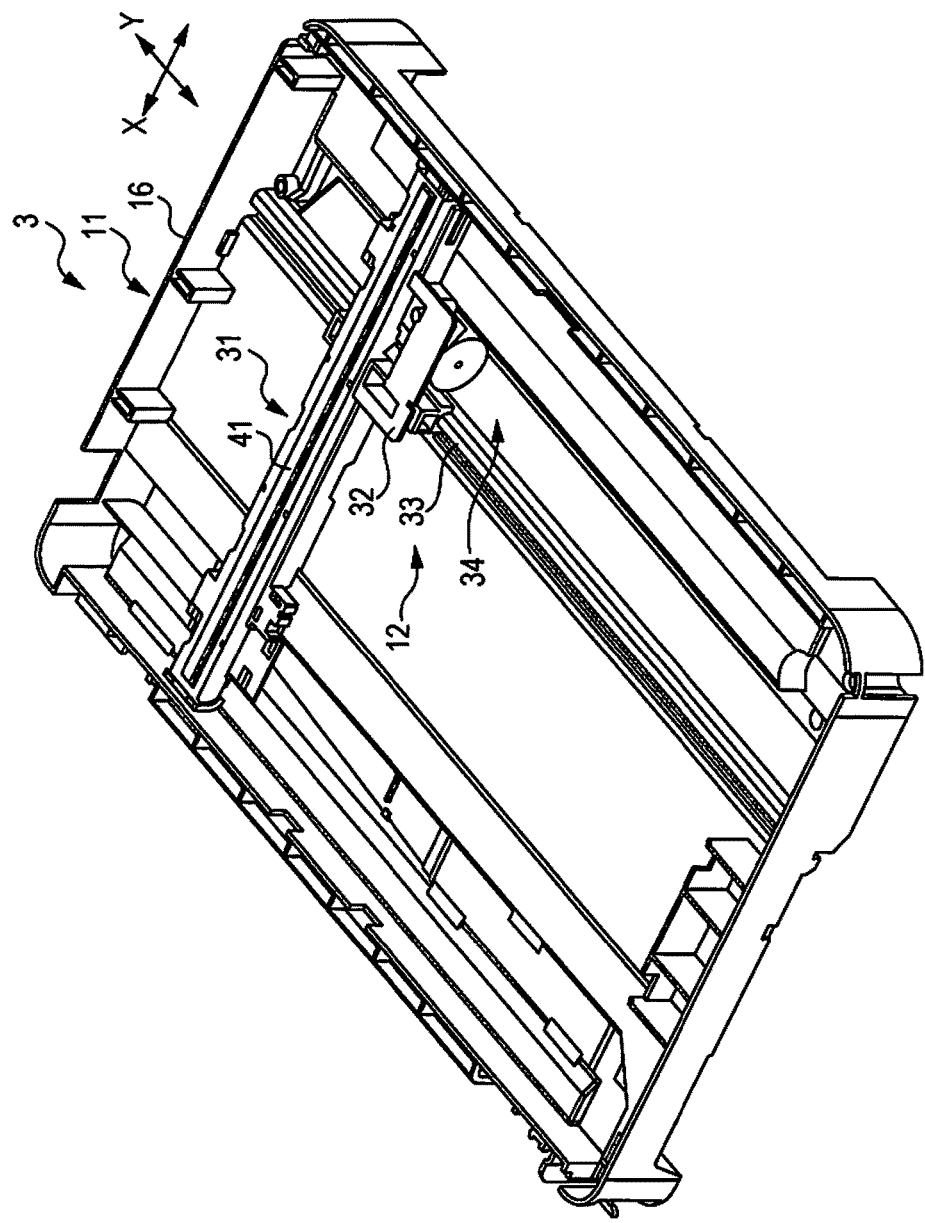
FIG. 2 is a perspective view illustrating an internal structure of a scanner unit.

FIG. 2 is a perspective view illustrating an internal structure of the scanner unit 3. As illustrated in FIGS. 1 and 2, the scanner unit 3 includes an upper frame 11 which is a housing, an image reading unit 12 accommodated in the upper frame 11, and an upper lid 13 supported by an upper portion of the upper frame 11. The upper lid 13 is supported so as to be revolvable. As illustrated in FIG. 2, the upper frame 11 includes a box type lower case 16 which accommodates the image reading unit 12, and an upper case 17 which covers the top surface of the lower case 16. A document mounting panel (document stand not illustrated) formed of glass is widely disposed on the upper case 17. A read medium (original document) of which a read surface is positioned downwardly is mounted on this document mounting panel. The lower case 16 is formed so as to have a shallow box shape of which an upper surface is opened.

As illustrated in FIG. 2, the image reading unit 12 includes a sensor unit 31 of a line sensor type, a sensor carriage 32 in which the sensor unit 31 is mounted, a guide shaft 33 which is extended in the Y axis direction, and slidably supports the sensor carriage 32, and a self-traveling sensor moving mechanism 34 which moves the sensor carriage 32 along the guide shaft 33. The sensor unit 31 includes an image sensor module 41 which is a complementary metal-oxide-semiconductor (CMOS) line sensor extended in the X axis direction. The sensor moving mechanism 34 drives by a motor, and thus the sensor unit 31 performs reciprocation along the guide shaft 33, in the Y axis direction. Thus, an image of the read medium (original document) on the document mounting panel is read. The sensor unit 31 may be a charge coupled device (CCD) line sensor.

FIG. 3 is an exploded perspective view schematically illustrating a configuration of the image sensor module 41. In the example illustrated in FIG. 3, the image sensor module 41 includes a case 411, a light source 412, a lens 413, a module substrate 414, and an image reading chip (semiconductor device) 415 for reading an image. The light source 412, the lens 413, and the image reading chip 415 are accommodated between the case 411 and the module substrate 414. A slit is provided in the case 411. The light source 412 includes, for example, light emitting diodes (LED) of R, G, and B. The light emitting diodes of R, G, and B (red LED, green LED, and blue LED) emit sequentially light while being rapidly switched. Light emitted by the light source 412 is applied to a read medium through the slit, and light from the read medium is input to the lens 413 through the slit. The lens 413 guides the input light to the image reading chip 415.

FIG. 4 is a schematic plan view illustrating a disposition of the image reading chip 415. As illustrated in FIG. 4, a plurality of image reading chips 415 is arranged on the module substrate 414 in an one-dimensional direction (X axis direction in FIG. 4). Each of the image reading chips 415 includes multiple light receiving elements which are disposed in a line (see FIGS. 6 and 10). As density of the light receiving elements provided in each of the image reading chip 415 becomes higher, the scanner unit (image reading apparatus) 3 having high resolution for reading an image can be realized. As the number of the image reading chips 415 becomes more, the scanner unit (image reading apparatus) 3 which, can also read a big image can be realized.

2. Functional Configuration of Scanner Unit (Image Reading Apparatus)

Figure 5:
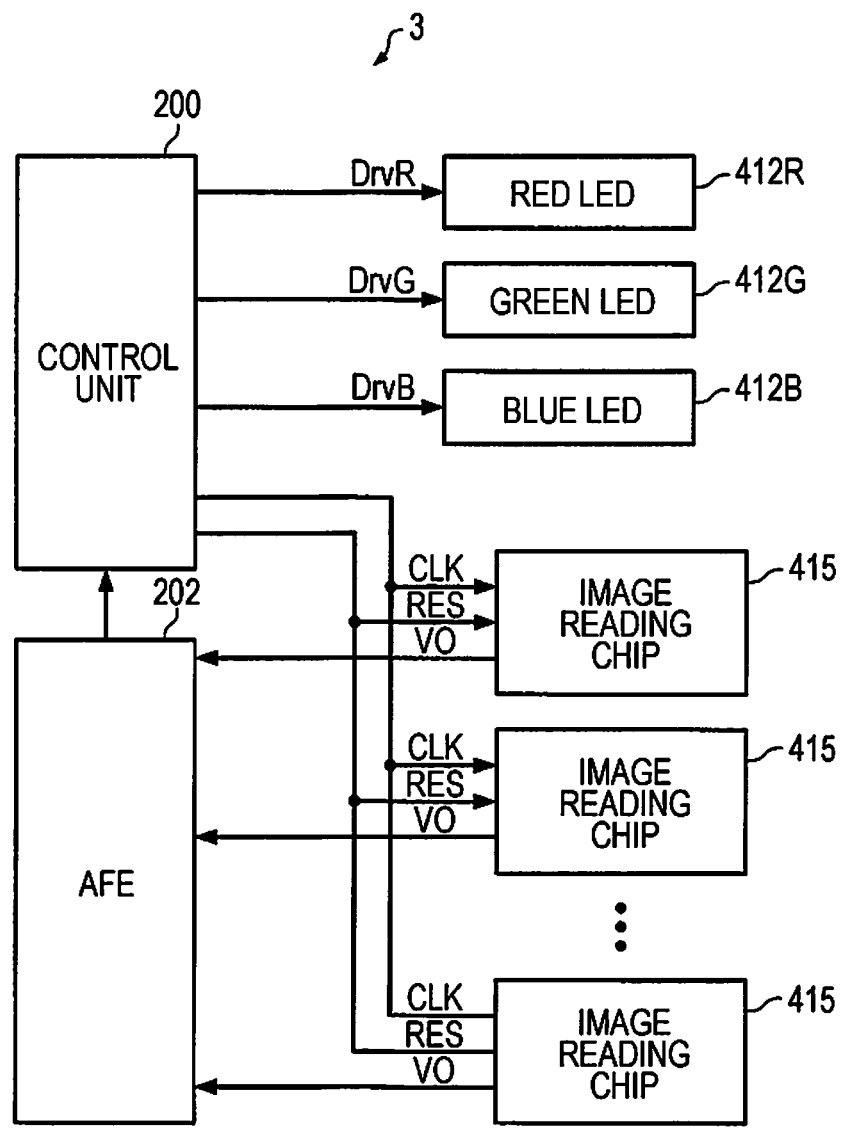
FIG. 5 is a diagram illustrating a functional configuration of the scanner unit.

FIG. 5 is a functional block diagram illustrating a functional configuration of the scanner unit (image reading apparatus) 3. In the example illustrated in FIG. 5, the scanner unit (image reading apparatus) 3 includes a control unit 200, an analog front end (AFE) 202, a red LED 412R, a green LED 412G, a blue LED 412B, and the plurality of image reading chips 415. As described above, the red LED 412R, the green LED 412G, and the blue LED 412B include the light source 412. The plurality of image reading chips 415 is disposed on the module substrate 414 in parallel. A plurality of red LEDs 412R, a plurality of green LEDs 412G, and a plurality of blue LEDs 412B may be provided. The control unit 200 and the analog front end (AFE) 202 are provided on the module substrate 414 or a substrate (not illustrated) which is different from the module substrate 414. Each of the control unit 200 and the analog front end (AFE) 202 may be realized by an integrated circuit (IC).

When a cycle for reading an image is set to be T, the control unit 200 supplies a drive signal DrvR to the red LED 412R for each of 3T, by a predetermined exposure time Δt, and thus causes the red LED 412R to emit light. Similarly, the control unit 200 supplies a drive signal DrvG to the green LED 412G for each of 3T, by the exposure time Δt, and thus causes the green LED 412G to emit light. The control unit 200 supplies a drive signal DrvB to the blue LED 412B for each of 3T, by the exposure time Δt, and thus causes the blue LED 412B to emit light. The control unit 200 causes any one of the red LED 412R, the green LED 412G, and the blue LED 412B to emit light for each cycle T.

The control unit 200 commonly supplies a clock signal CLK and a resolution setting signal RES to the plurality of the image reading chips 415. The clock signal CLK is an operation clock signal for the image reading chip 415. The resolution setting signal RES is a signal for setting resolution at which the scanner unit (image reading apparatus) 3 reads an image. In the following descriptions, the resolution setting signal RES is a two-bit signal. The resolution setting signal RES is assumed as follows. When the resolution setting signal RES is "00", resolution is set to 1200 dpi. When the resolution setting signal RES is "01", resolution is set to 600 dpi. When the resolution setting signal RES is "10", resolution is set to 300 dpi.

Each of the image reading chips 415 operates with synchronization with the clock signal CLK. The red LED 412R, the green LED 412G, or the blue LED 412B emits light, and thus generates an image signal VO including image information of resolution which is set by the resolution setting signal RES, based on light received from an image which is formed on a read medium by each light receiving element. Each of the image reading chips 415 outputs the generated image signal VO. A circuit configuration and an operation of the image reading chip 415 will be described later in detail.

The analog front end (AFE) 202 receives a plurality of image signals VO which are output by the plurality of the image reading chips 415, and performs amplification or A/D conversion on each of the image signals VO. The analog front end (AFE) 202 converts each of the image signals VO into a digital signal which has a digital value depending on intensity of received light of each of the light receiving elements. The analog front end (AFE) 202 sequentially transmits digital signals to the control unit 200.

The control unit 200 receives the digital signals which are sequentially transmitted from the analog front end (AFE) 202, and generates image information which has been read by the image sensor module 41.

3. Circuit Configuration and Operation of Image Reading Chip

Figure 6:
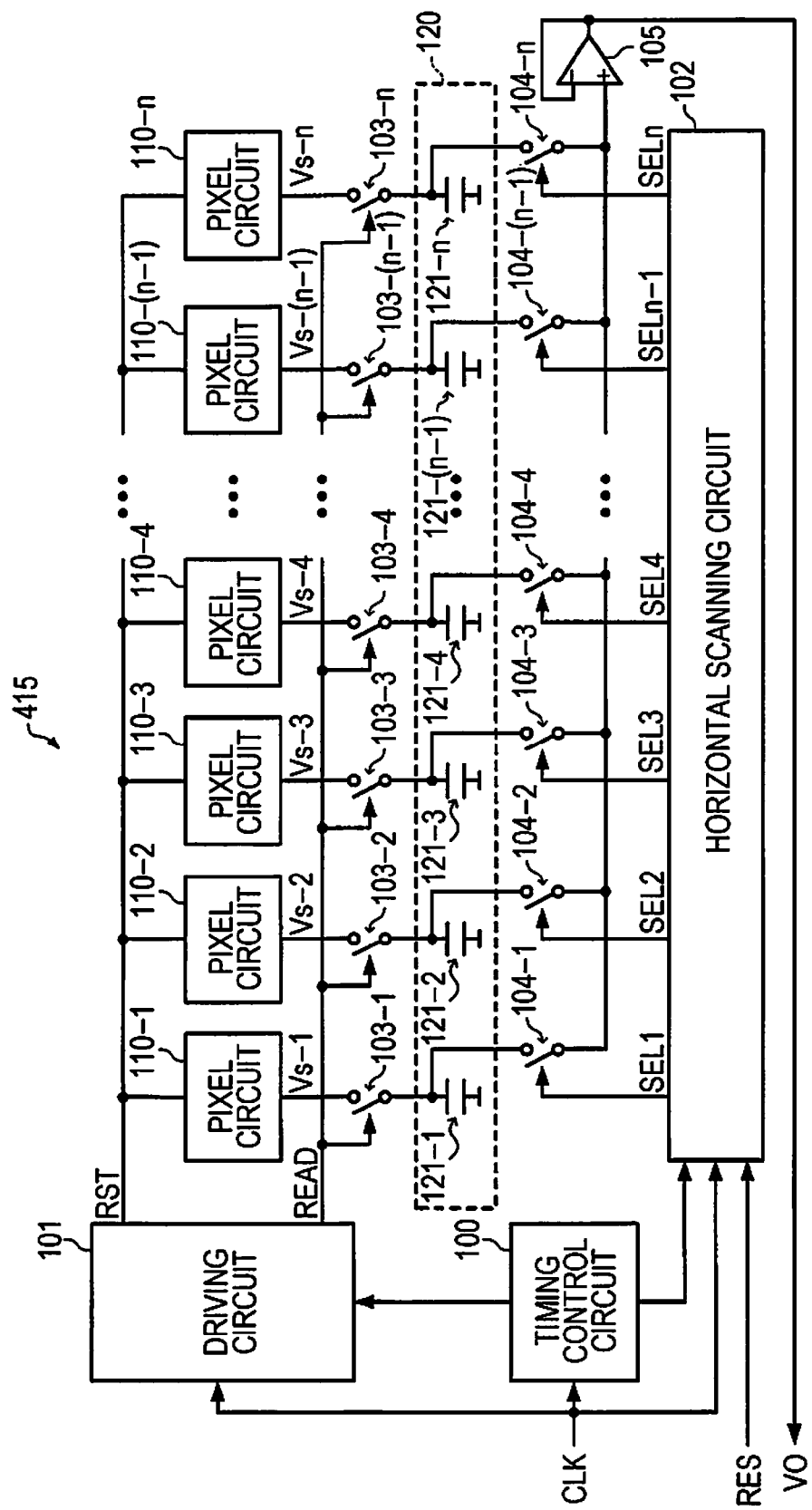
FIG. 6 is a diagram illustrating a circuit configuration of the image reading chip.
Figure 7:
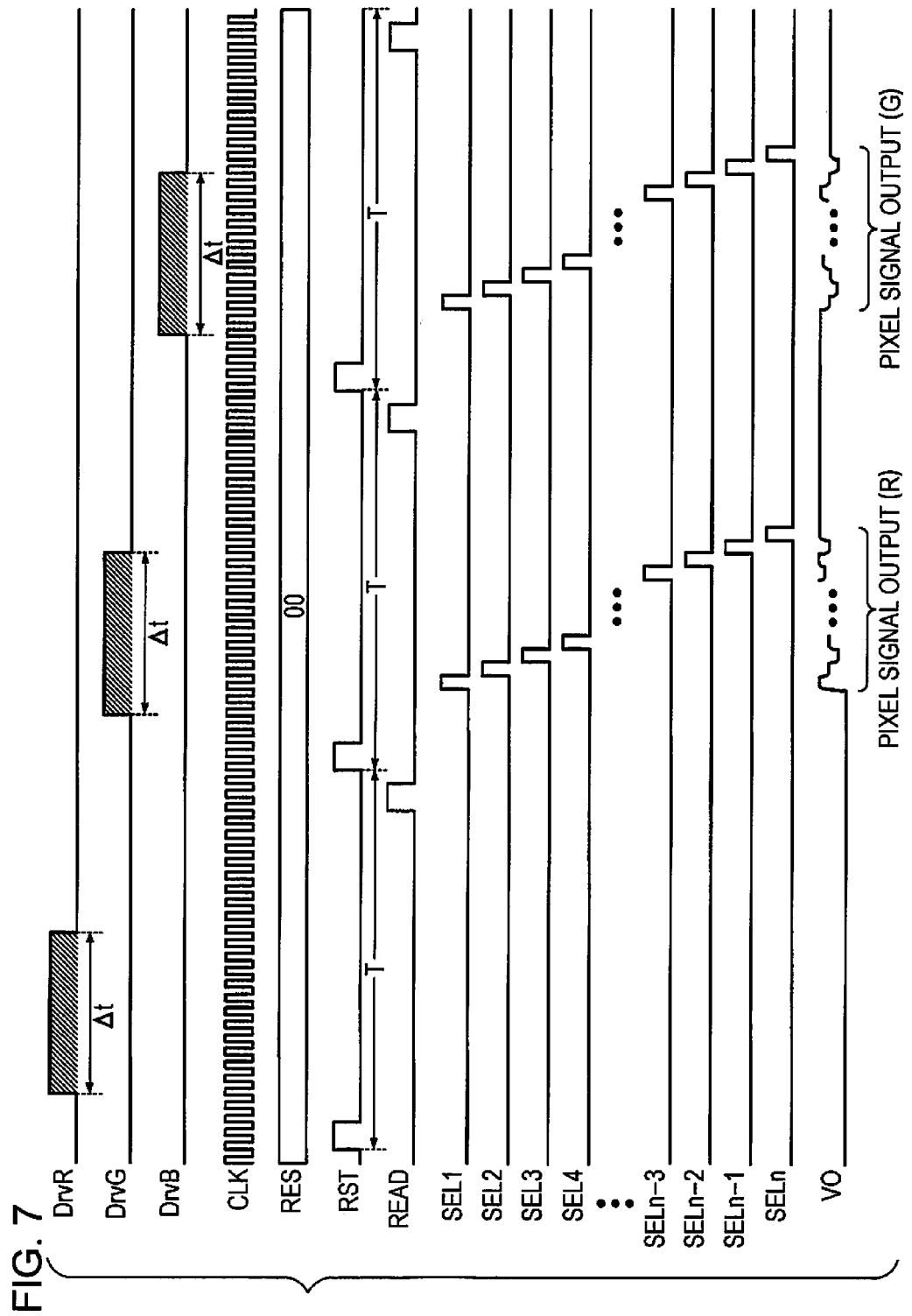
FIG. 7 is a timing chart of signals relating to an operation of the image reading chip.
Figure 8:
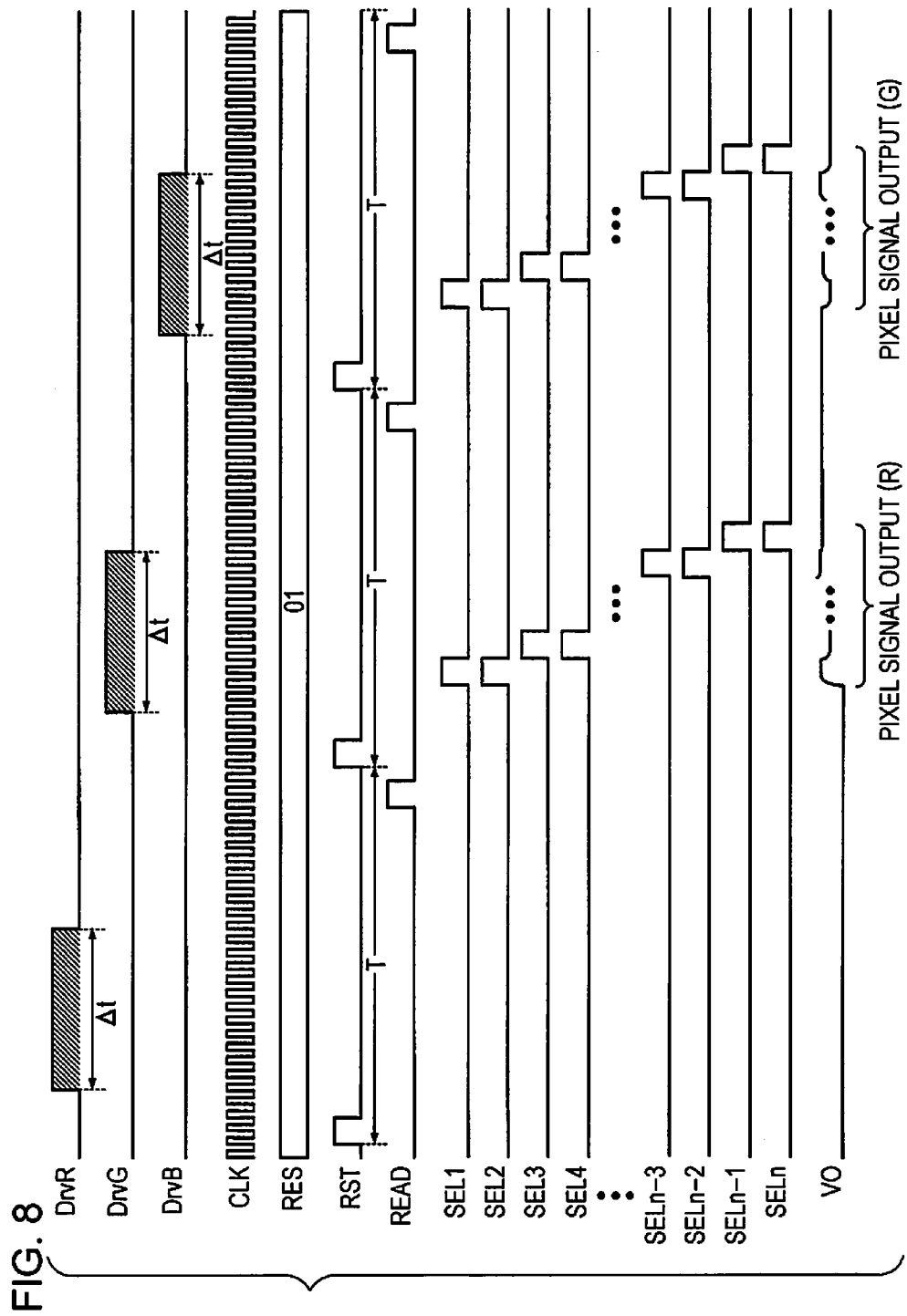
FIG. 8 is a timing chart of signals relating to an operation of the image reading chip.
Figure 9:
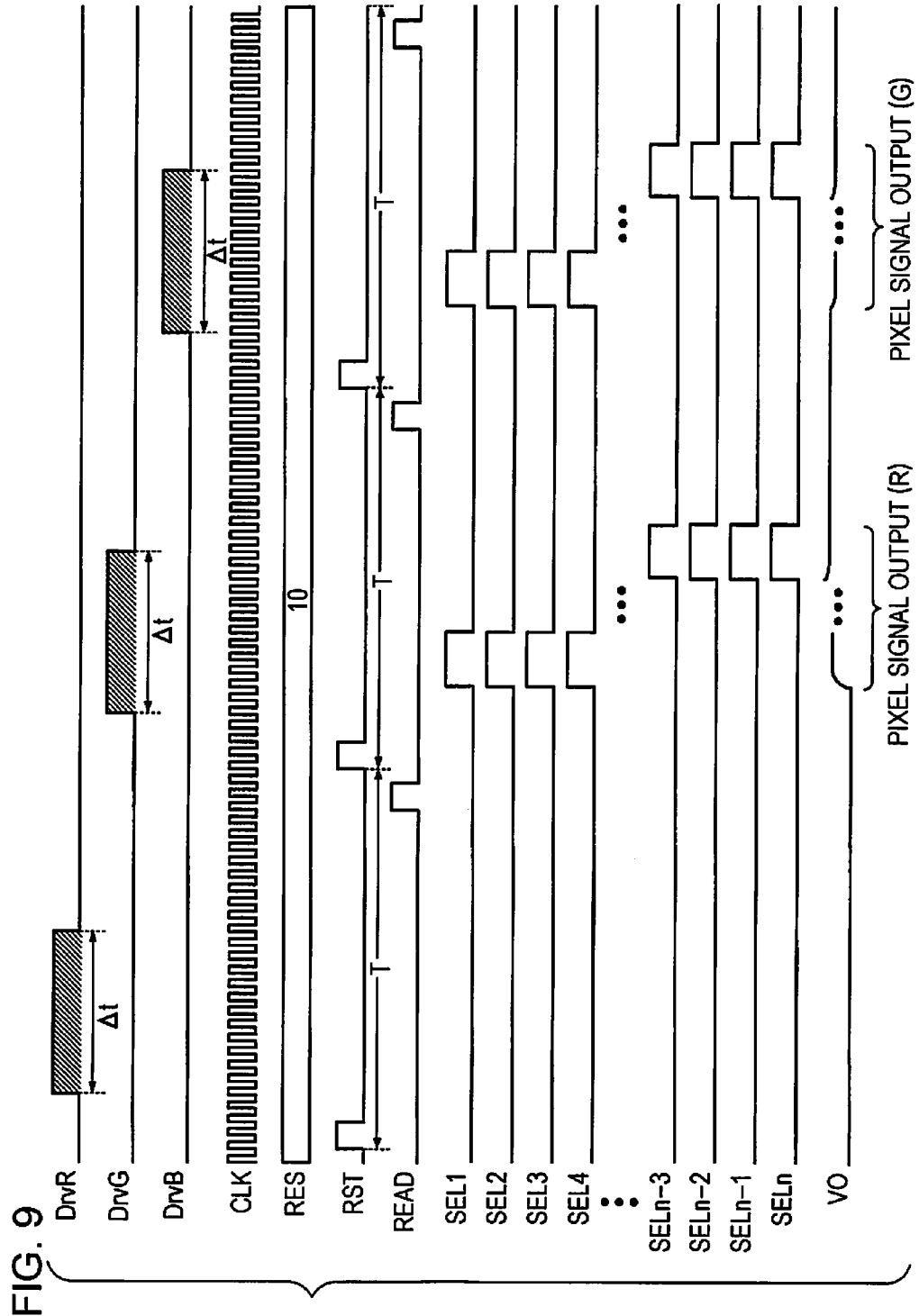
FIG. 9 is a timing chart of signals relating to an operation of the image reading chip.

FIG. 6 is a diagram illustrating a circuit configuration of the image reading chip 415. FIGS. 7, 8, and 9 are timing charts of signals relating to the image reading chip 415 in a case where resolution at which the scanner unit (image reading apparatus) 3 reads an image is set to 1200 dpi, 600 dpi, and 300 dpi.

The image reading chip 415 illustrated in FIG. 6 includes a timing control circuit 100, a driving circuit 101, a horizontal scanning circuit 102, n pieces of pixel circuits 110-1 to 110-n, n pieces of first switch circuits 103-1 to 103-n, n pieces of capacitance elements 121-1 to 121-n, n pieces of second switch circuits 104-1 to 104-n, and an operation amplifier 105.

The timing control circuit 100 counts pulses of the clock signal CLK. The timing control circuit 100 includes a counter (not illustrated) for initializing a count value for each cycle T for reading an image. The timing control circuit 100 generates a control signal for controlling an operation of the driving circuit 101, and a control signal for controlling an operation of the horizontal scanning circuit 102, based on an output value (count value) of the counter.

The driving circuit 101 generates a reset signal RST at the cycle T, based on the control signal from the timing control circuit 100 (see FIGS. 7 to 9). The reset signal RST is synchronized with the clock signal CLK, and becomes active (high level in the exemplary embodiment) for a predetermined period at a predetermined timing before the red LED 412R, the green LED 412G, or the blue LED 412B emits light. The reset signal RST is commonly supplied to n pieces of the pixel circuits 110-1 to 110-n.

The driving circuit 101 generates a reading signal READ at the cycle T, based on the control signal from the timing control circuit 100 (see FIGS. 7 to 9). The reading signal READ is synchronized with the clock signal CLK, and becomes active (high level in the exemplary embodiment) for a predetermined period at a predetermined timing after light emitting by the red LED 412R, the green LED 412G, or the blue LED 412B is ended. The reading signal READ is commonly supplied to third terminals (control terminals) of n pieces of the first switch circuits 103-1 to 103-n.

Each of n pieces of pixel circuits 110-1 to 110-n is initialized by the reset signal RST from the driving circuit 101. Then, each of n pieces of pixel circuits 110-1 to 110-n outputs voltages Vs-1 to Vs-n depending on light received from a read medium for an exposure time Δt by the red LED 412R, the green LED 412G, or the blue LED 412B emitting light.

A first terminal of each of n pieces of first switch circuits 103-1 to 103-n is connected to an output terminal of each of n pieces of the pixel circuits 110-1 to 110-n. A second terminal of each of n pieces of the first switch circuits 103-1 to 103-n is connected to one end of each of n pieces of the capacitance elements 121-1 to 121-n. Each of n pieces of the first switch circuits 103-1 to 103-n is conducted (conducted between the first terminal and the second terminal) when the reading signal READ supplied to the third terminal (control terminal) is active (high level). Each of n pieces of the first switch circuits 103-1 to 103-n is unconducted (unconducted between the first terminal and the second terminal) when the reading signal READ is inactive (low level).

Each of n pieces of the capacitance elements 121-1 to 121-n has one end which is connected to an output terminal of each of n pieces of pixel circuits 110-1 to 110-n. A predetermined reference potential (for example, ground potential (0 V)) is commonly applied to another ends of n pieces of capacitance elements 121-1 to 121-n. Thus, for each cycle T, n pieces of the first switch circuits 103-1 to 103-n are conducted for a predetermined period when the reading signal READ is active (high level), and the output terminal of each of n pieces of the pixel circuits 110-1 to 110-n is electrically connected to one end of each of n pieces of the capacitance elements 121-1 to 121-n. Thus, charges depending on each of output voltages Vs-1 to Vs-n of n pieces of the pixel circuits 110-1 to 110-n are held in each of n pieces of the capacitance elements 121-1 to 121-n. In this manner, n pieces of the capacitance elements 121-1 to 121-n constitute a line memory 120 for holding charges which depend on each of the output voltages Vs-1 to Vs-n of n pieces of the pixel circuits 110-1 to 110-n.

A first terminal of each of n pieces of the second switch circuits 104-1 to 104-n is connected to the one end of each of n pieces of the capacitance elements 121-1 to 121-n. A second terminal thereof is commonly connected to a non-inverted input terminal of the operation amplifier 105. Selection signal SEL1 to SELn from the horizontal scanning circuit 102 are supplied to third terminals (control terminals) of n pieces of the second switch circuits 104-1 to 104-n, respectively. When each of the selection signals SEL1 to SELn supplied to the third terminals (control terminals) is active (high level), n pieces of the second switch circuits 104-1 to 104-n is conducted (conducted between the first terminal and the second terminal). When each of the selection signal SEL1 to SELn is inactive (low level), n pieces of the second switch circuits 104-1 to 104-n is unconducted (unconducted between the first terminal and the second terminal).

The horizontal scanning circuit 102 generates n pieces of selection signals SEL1 to SELn based on the control signal and the resolution setting signal RES from the timing control circuit 100 (see FIGS. 7 to 9). Each of n pieces of the selection signals SEL1 to SELn is synchronized with the clock signal CLK, and becomes active (high level in the exemplary embodiment) for a predetermined period at a predetermined timing before the reading signal READ becomes active (high level) on the cycle T (after the reading signal READ is changed from being active (high level) to being inactive (low level) on a cycle T before one cycle). When the resolution setting signal RES is "00" (when the resolution is set to 1200 dpi), the horizontal scanning circuit 102 generates n pieces of the selection signals SEL1 to SELn which sequentially become active (high level) one by one for each one cycle of the clock signal (see FIG. 7). When the resolution setting signal RES is "01" (when the resolution is set to 600 dpi), the horizontal scanning circuit 102 generates n pieces of the selection signals SEL1 to SELn which simultaneously become active (high level) by two for each of two cycles of the clock signal in an order (see FIG. 8). When the resolution setting signal RES is "10" (when the resolution is set to 300 dpi), the horizontal scanning circuit 102 generates n pieces of the selection signals SEL1 to SELn which simultaneously become active (high level) by four for each of four cycles of the clock signal in an order (see FIG. 9).

The operation amplifier 105 has the non-inverted input terminal to which the second terminal of each of n pieces of the second switch circuits 104-1 to 104-n is commonly connected. An inverted input terminal and the output terminal thereof are connected to each other. The operation amplifier 105 is a voltage follower, and an output voltage of the operation amplifier 105 coincides with a voltage at the non-inverted input terminal. The output signal of the operation amplifier 105 is output as an image signal VO, from the image reading chip 415. Thus, when the resolution setting signal RES is "00" (when the resolution is set to 1200 dpi), the voltage of the image signal VO becomes one voltage which is sequentially selected by n pieces of the selection signals SEL1 to SELn, among voltages (voltage depending on charges held on the cycle T before one cycle) of one ends of n pieces of capacitance elements 121-1 to 121-n, for a predetermined duration on the cycle T (see FIG. 7). When the resolution setting signal RES is "01" (when the resolution is set to 600 dpi), the voltage of the image signal VO becomes an average voltage of two voltages which are sequentially selected by n pieces of the selection signals SEL1 to SELn, among voltages (voltage depending on charges held on the cycle T before one cycle) of one ends of n pieces of capacitance elements 121-1 to 121-n, for a predetermined duration on the cycle T (see FIG. 8). When the resolution setting signal RES is "10" (when the resolution is set to 300 dpi), the voltage of the image signal VO becomes an average voltage of four voltages which are sequentially selected by n pieces of the selection signals SEL1 to SELn, among voltages (voltage depending on charges held on the cycle T before one cycle) of one ends of n pieces of capacitance elements 121-1 to 121-n, for a predetermined duration on the cycle T (see FIG. 9).

4. Configuration and Operation of Pixel Circuit

All of n pieces of pixel circuits 110-1 to 110-n illustrated in FIG. 6 have the same configuration. Thus, a configuration and an operation will be described below on the assumption that all of n pieces of pixel circuits 110-1 to 110-n are described as a pixel circuit 110, and all of the output voltages Vs-1 to Vs-n of n pieces of pixel circuits 110-1 to 110-n are described as an output voltage Vs.

Figure 10:
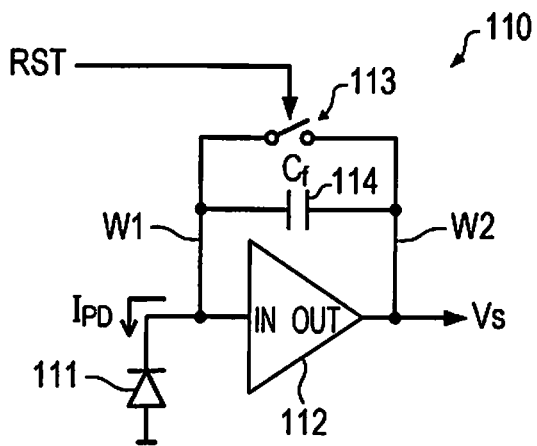
FIG. 10 is a diagram illustrating a configuration of a pixel circuit.

FIG. 10 is a diagram illustrating a configuration of the pixel circuit 110. As illustrated in FIG. 10, the pixel circuit 110 includes a light receiving element 111, an amplification unit 112, a switch element 113, and a capacitor 114.

The light receiving element 111 receives light (in the exemplary embodiment, light from an image formed on a read medium), and converts (photoelectrically-converts) the received light into an electric signal. In the exemplary embodiment, the light receiving element 111 is configured by a photodiode. An anode of the light receiving element 111 is grounded, and a cathode thereof is electrically connected to an input terminal IN of the amplification unit 112.

The amplification unit 112 is electrically connected to the light receiving element 111, and amplifies a signal generated by the light receiving element 111 performing photoelectric conversion. Specifically, the amplification unit 112 is an inverting amplifier which has the input terminal IN which is electrically connected to the cathode of the light receiving element 111, and outputs a voltage obtained by multiplying the voltage of the input terminal IN by –G, from the output terminal OUT. The output voltage of the amplification unit 112 becomes the output voltage Vs of the pixel circuit 110.

The switch element 113 is electrically connected to both of the ends (input terminal IN and output terminal OUT) of the amplification unit 112, so as to be in parallel with the amplification unit 112. The reset signal RST is input to the control terminal of the switch element 113. When the reset signal RST becomes active (high level), both of the ends of the switch element 113 are conducted. When the reset signal RST becomes inactive (low level), both of the ends of the switch element 113 are unconducted. For example, the switch element 113 may be an NMOS transistor of which the reset signal RST is input to a gate terminal, one of the source terminal and the drain terminal is connected to the input terminal IN of the amplification unit 112, and another of the source terminal and the drain terminal is connected to the output terminal OUT of the amplification unit 112.

The capacitor 114 is electrically connected to both of the ends (input terminal IN and output terminal OUT) of the amplification unit 112, so as to be in parallel with the amplification unit 112. That is, the capacitor 114 functions as feedback capacitance provided on a signal feedback path from the output terminal OUT of the amplification unit 112 to the input terminal IN thereof. The capacitor 114 has a capacitance value $C_f$.

Figure 11:
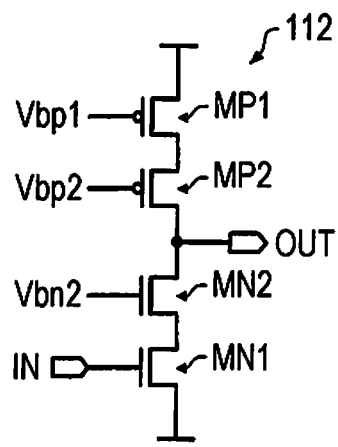
FIG. 11 is a diagram illustrating a circuit configuration of an amplification unit.

FIG. 11 is a diagram illustrating a circuit configuration of the amplification unit 112 which is an inverting amplifier. As illustrated in FIG. 11, the amplification unit 112 includes an NMOS transistor MN1, an NMOS transistor MN2, a PMOS transistor MP1, and a PMOS transistor MP2.

The NMOS transistor MN1 has a gate terminal which is connected to the input terminal IN of the amplification unit 112, a source terminal which is grounded, and a drain terminal which is connected to a source terminal of the NMOS transistor MN2. Thus, the signal generated by photoelectric conversion of the light receiving element 111 is input to the gate terminal of the NMOS transistor MN1 (first transistor).

The NMOS transistor MN2 has a gate terminal to which a constant bias voltage Vbn2 is supplied, a source terminal which is connected to the drain terminal of the NMOS transistor MN1, and a drain terminal which is connected to a drain terminal of the PMOS transistor MP2 and the output terminal OUT of the amplification unit 112. That is, the NMOS transistor MN2 (second transistor) is electrically connected to a node between the NMOS transistor MN1 and the output terminal OUT of the amplification unit 112. The NMOS transistor MN1 and the NMOS transistor MN2 are cascode-connected.

The PMOS transistor MP1 has a gate terminal to which a constant bias voltage Vbp1 is supplied, a source terminal to which a power source voltage supplied to the image reading chip 415 from the outside of the circuit is applied, and a drain terminal which is connected to a source terminal of the PMOS transistor MP2.

The PMOS transistor MP2 has a gate terminal to which a constant bias voltage Vbp2 is supplied, a source terminal which is connected to the drain terminal of the PMOS transistor MP1, and a drain terminal which is connected to the drain terminal of the NMOS transistor MN2 and the output terminal OUT of the amplification unit 112.

The bias voltages Vbn2, Vbp1, and Vbp2 are constant voltages for operating each of the NMOS transistor MN2, the PMOS transistor MP1, and the PMOS transistor MP2 in a saturated region. In FIGS. 10 and 11, a constant voltage source (not illustrated) generates the bias voltages Vbn2, Vbp1, and Vbp2.

In the amplification unit 112 having such a configuration, the PMOS transistor MP1 functions as a constant voltage source. A constant current from the PMOS transistor MP1 flows between the drain and the source of the NMOS transistor MN1, and thus a drain voltage of the NMOS transistor MN1 becomes a voltage obtained by inverting and amplifying a voltage at the input terminal IN. The NMOS transistor MN2 and the PMOS transistor MP2 are provided so as to increase output impedance. In other words, the NMOS transistor MN2 and the PMOS transistor MP2 are provided so as to increase a voltage amplification rate G. Thus, the voltage amplification rate G which is equal to or more than 1000 times is realized.

Figure 12:
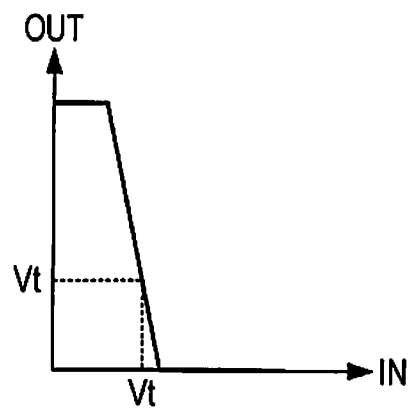
FIG. 12 is a diagram illustrating voltage characteristics between an input and an output of the amplification unit.

FIG. 12 is a diagram illustrating voltage characteristics between an input and an output of the amplification unit 112 which is configured as illustrated in FIG. 11. In FIG. 12, a horizontal axis indicates the voltage at the input terminal IN, and a vertical axis indicates the voltage of the output terminal OUT. As illustrated in FIG. 12, the amplification unit 112 sets the voltage of the output terminal OUT to be a threshold voltage Vt of the inverting amplifier illustrated in FIG. 11, when the voltage of the input terminal IN is the threshold voltage Vt. The threshold voltage Vt is expressed by the following Expression (1).

$$Vt = Vth + \sqrt{\frac{2 \cdot Id}{\mu \cdot C_{ox}} \cdot \frac{L}{W}} \qquad (1)$$

In Expression (1), Vth indicates a threshold voltage of the NMOS transistor MN1, Id indicates a current flowing in the NMOS transistor MN1, μ indicates mobility, Cox indicates gate capacitance per unit area, L indicates a gate length of the NMOS transistor MN1, and W indicates a gate width of the NMOS transistor MN1.

In FIG. 12, an absolute value of an inclination of a region in which the voltage of the output terminal OUT is linearly changed, to the voltage of the input terminal IN corresponds to the voltage amplification rate G of the amplification unit 112. The voltage amplification rate G is adjusted so as to be equal to or more than 1000 times.

Figure 13:
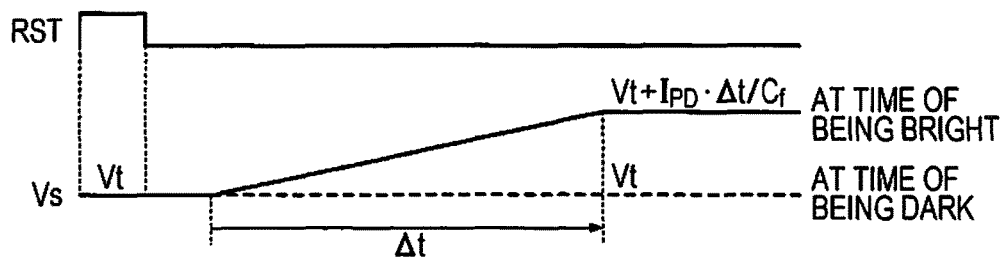
FIG. 13 is a timing chart illustrating an operation of the pixel circuit.

Next, an operation of the pixel circuit 110 will be described. FIG. 13 is a timing chart illustrating an operation of the pixel circuit 110.

As illustrated in FIG. 13, firstly, the reset signal RST becomes a high level and the switch element 113 is conducted. Thus, both of the ends (input terminal IN and output terminal OUT) of the amplification unit 112 are disconnected. Thus, the input voltage and the output voltage of the amplification unit 112 (the output voltage Vs of the pixel circuit 110) become the threshold voltage Vt together. If the input voltage and the output voltage are the threshold voltage Vt, potentials at both of the ends of the capacitor 114 are equal to each other. Thus, charges held in the capacitor 114 are left.

Then, if the reset signal RST becomes a low level, the switch element 113 is unconducted, and then, the red LED 412R, the green LED 412G, or the blue LED 412B emits light by the exposure time Δt. If the light receiving element 111 does not receive light from a read medium for the exposure time Δt, photoelectric conversion by the light receiving element 111 is not performed, and thus the output voltage of the amplification unit 112 (output voltage Vs of the pixel circuit 110) is maintained to be Vt (broken line in FIG. 13).

If the light receiving element 111 receives light from the read medium for the exposure time Δt, a current $I_{PD}$ flows from the cathode to the anode. The current $I_{PD}$ causes charges to be accumulated in the capacitor 114, the input voltage of the amplification unit 112 is decreased, and the output voltage of the amplification unit 112 (output voltage Vs of the pixel circuit 110) is increased (solid line in FIG. 13).

At this time, the output voltage Vs of the pixel circuit 110 is expressed as with the following Expression (2), by using the threshold voltage Vt of the amplification unit 112, the current $I_{PD}$ flowing in the light receiving element 111, the exposure time Δt, the capacitance value $C_f$ of the capacitor 114, the voltage amplification rate G of the amplification unit 112, and parasitic capacitance $C_{PD}$ between the anode and the cathode of the light receiving element 111.

$$Vs = Vt + \frac{I_{PD} \cdot \Delta t}{(1 + 1/G) \cdot C_f + C_{PD}/G} \qquad (2)$$

Here, in the exemplary embodiment, the voltage amplification rate G of the amplification unit 112 is equal to more than 1000, and thus it can be considered that 1/G and $C_{PD}/G$ on the right side of Expression (2) are 0. Thus, the output voltage Vs of the pixel circuit 110 is approximate as in Expression (3).

$$Vs \cong Vt + \frac{I_{PD} \cdot \Delta t}{C_f} \qquad (3)$$

As apparent from Expression (3), sensitivity of the pixel circuit 110 (a changed amount of the output voltage Vs to the current $I_{PD}$ flowing in the light receiving element 111) is inversely proportional to the capacitance value $C_f$ of the capacitor 114. Thus, in order to improve the sensitivity of the pixel circuit 110 or the sensitivity of the image reading chip 415 or the scanner unit (image reading apparatus) 3, it is desirable that the capacitance value $C_f$ of the capacitor 114 be small.

5. Configuration of Capacitor

As a general method for realizing the capacitor 114 on the semiconductor substrate of the image reading chip 415, a method using MOS capacitance, PIP capacitance, or MIM capacitance has been known.

The MOS capacitance corresponds to a gate capacitance of an MOS transistor. In the MOS capacitance, capacitance per unit area is relatively large. Thus, it is possible to realize a small capacitance value with a small area. However, processing accuracy in the manufacturing process has a limit, and thus it is difficult to realize the small capacitance value $C_f$ which is equal to or more than some degrees by using MOS capacitance. Thus, it is difficult to improve sensitivity by using MOS capacitance. Further, because MOS capacitance has bias dependency, the capacitance value $C_f$ is changed by intensity of light (size of the current $I_{PD}$) received by the light receiving element 111. As a result, linearity of the output voltage Vs of the pixel circuit 110 to the intensity of light received by the light receiving element 111 is deteriorated.

The PIP capacitance is capacitance configured by two polysilicon wires and an insulating interlayer film. The polysilicon wires are provided in two layers, respectively. The insulating interlayer film is provided between the two polysilicon wires. Because the PIP capacitance does not have bias dependency, it is possible to improve linearity of the output voltage Vs of the pixel circuit 110. However, a process which is not required in the general manufacturing process and in which a polysilicon wire in the second layer is formed is additionally required. Thus, cost is increased.

The MIM capacitance is capacitance configured by two metallic wires and an insulating interlayer film. The two metallic wires are provided in two layers, respectively. The insulating interlayer film is provided between the two metallic wires. Because the MIM capacitance does not have bias dependency, it is possible to improve linearity of the output voltage Vs of the pixel circuit 110. However, it is necessary that a process of thinning the interlayer insulating film between the two metallic insulating layers is added to the general manufacturing process. Thus, cost is increased.

As described above, if the capacitor 114 having a small capacitance value $C_f$ is realized by using MOS capacitance, PIP capacitance, or MIM capacitance, deterioration of sensitivity or linearity of the output voltage Vs, or an increase of cost occurs. Thus, the above-described method is not the optimum method.

Thus, in the exemplary embodiment, the capacitor 114 is configured as interconnect capacitance between a first wire W1 (see FIG. 10) and a second wire W2 (see FIG. 10). The first wire W1 electrically connects one end (cathode) of the light receiving element 111, one end (input terminal IN) of the amplification unit 112, and one end of the switch element 113. The second wire W2 electrically connects another end (output terminal OUT) of the amplification unit 112 and another end of the switch element 113. In particular, the first wire W1 and the second wire W2 constituting the capacitor 114 are provided in the same wiring layer among a plurality of wiring layers included on the semiconductor substrate of the image reading chip 415. The wiring layer in which the first wire W1 and the second wire W2 constituting the capacitor 114 are provided may be the bottom wiring layer, or the top wiring layer, or a wiring layer between the bottom wiring layer and the top wiring layer, among the plurality of wiring layers.

In this manner, the capacitor 114 is configured as interconnect capacitance between the first wire W1 and the second wire W2 which are provided in the same wiring layer, and thus it is possible to realize small capacitance value $C_f$. Thus, it is possible to improve the sensitivity. If the capacitor 114 has the above-described configuration, the capacitor 114 does not have bias dependency. Thus, it is possible to improve linearity of the output voltage Vs of the pixel circuit 110. Since such capacitor 114 is realized in a process included in the general manufacturing process, an additional process is not required, and cost is not increased. Further, the capacitor 114 may be disposed in a wiring layer higher than a layer in which various elements such as a MOS transistor and a resistor are formed, and be disposed so as to overlap a region in which the element is formed when viewed in a plan of the semiconductor substrate. Thus, it is also effective in reducing a size of the image reading chip 415.

The sensitivity is improved as the capacitance value $C_f$ of the capacitor 114 becomes smaller. However, if the capacitance value $C_f$ of the capacitor 114 is excessively small, parasitic capacitance between the first wire W1 and the second wire W2 is larger than the capacitor 114. If the parasitic capacitance is larger than the capacitor 114, manufacturing variation due to the parasitic capacitance may be large as much as corresponding to capacitance variation due to the capacitor 114, and accurate estimation in the design stage may be difficult. Thus, variation of the sensitivity may be increased. Thus, it is desirable that the capacitance value $C_f$ of the capacitor 114 is more than the value of the parasitic capacitance between the first wire W1 and the second wire W2. The value of the parasitic capacitance between the first wire W1 and the second wire W2 is, for example, desirably about 0.5 fF (femto Farad). The capacitance value $C_f$ of the capacitor 114 (interconnect capacitance between the first wire W1 and the second wire W2) is desirably an order of femto Farad (fF), for example, equal to or more than 1 fF and less than 10 fF.

The thickness of the first wire W1 or the second wire W2 (thickness in a direction perpendicular to the semiconductor substrate) is significantly smaller than the minimum wiring width defined in the design rule. In addition, it is not possible to set a gap (distance) from the first wire W1 or the second wire W2 to be equal to or less than the minimum gap (minimum distance) defined in the design rule. If doing so, for example, if the capacitor 114 having capacitance value $C_f$ of 1 fF is assumed to be configured by interconnect capacitance between the first wire W1 and the second wire W2 which are linear and are provided in the same wiring layer, the first wire W1 and the second wire W2 are significantly long, and a chip area of the image reading chip 415 is increased.

Figure 14:
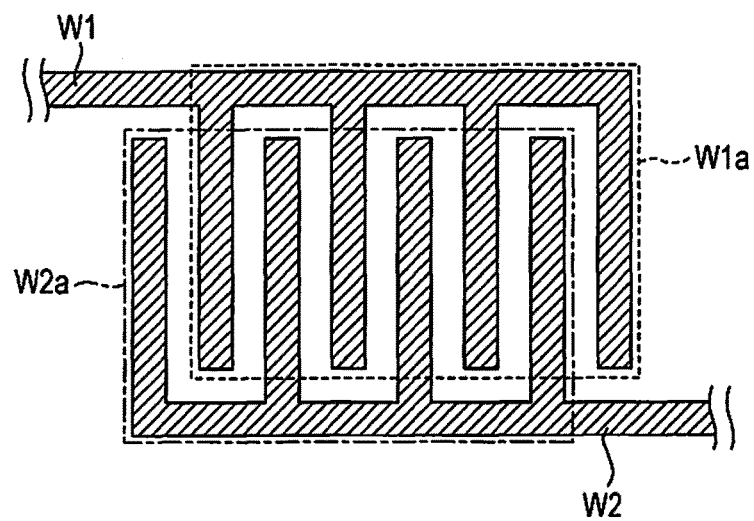
FIG. 14 is a diagram illustrating an example of a first wire and a second wire constituting capacitor.

Thus, in the exemplary embodiment, the shape of the first wire W1 and the second wire W2 constituting the capacitor 114 is considered in order to suppress an increase of the chip area. FIG. 14 is a diagram illustrating an example of the first wire W1 and the second wire W2 constituting the capacitor 114 in the exemplary embodiment. Each of the first wire W1 and the second wire W2 may be configured so as to cause wires in the plurality of wiring layers to be connected to each other by using a connector or a via. However, FIG. 14 illustrates only a portion constituting the capacitor 114 when the semiconductor substrate of the image reading chip 415 is viewed in plan.

As illustrated in FIG. 14, in the exemplary embodiment, the first wire W1 has a first comb-tooth shaped portion W1a, and the second wire W2 has a second comb-tooth shaped portion W2a. The first comb-tooth shaped portion W1a and the second comb-tooth shaped portion W2a are provided so as to mesh with each other. At this time, the capacitor 114 corresponds to capacitance between the first comb-tooth shaped portion W1a and the second comb-tooth shaped portion W2a. It is not possible to set a gap between the first comb-tooth shaped portion W1a and the second comb-tooth shaped portion W2a to be smaller than the minimum gap defined in the design rule. However, because an area of portions at which the first comb-tooth shaped portion W1a and the second comb-tooth shaped portion W2a face each other is large, it is possible to realize the capacitance value $C_f$ in an order of femto Farad with a small area. Further, if wiring having such a small area is provided, it is easy to perform disposition so as to overlap a region in which various elements are formed when viewed in a plan of the semiconductor substrate, and it is very effective in reducing the size of the image reading chip 415.

6. Advantages

According to the scanner unit (image reading apparatus) 3 of the exemplary embodiment, in the image reading chip 415, since the capacitor 114 which is connected in parallel to the amplification unit 112 is realized by the interconnect capacitance between the first wire W1 and the second wire W2, it is possible to reduce the capacitance value $C_f$. Accordingly, according to the scanner unit (image reading apparatus) 3 of the exemplary embodiment, it is possible to improve the sensitivity of the output signal of the image reading chip 415, and thus it is possible to read an image with high sensitivity.

According to the scanner unit (image reading apparatus) 3 of the exemplary embodiment, in the image reading chip 415, the capacitor 114 which is connected in parallel to the amplification unit 112 is realized by interconnect capacitance between the first wire W1 and the second wire W2, and thus bias dependency is not provided. Accordingly, it is possible to improve linearity of an output voltage to intensity of light received by the light receiving element 111.

According to the scanner unit (image reading apparatus) 3 of the exemplary embodiment, in the image reading chip 415, the capacitor 114 which is connected in parallel to the amplification unit 112 is configured by the first wire W1 and the second wire W2 provided in the same wiring layer. Thus, the capacitor 114 can be realized in a process included in a general semiconductor manufacturing process, an additional process is not required, and an increase of cost is not required.

According to the scanner unit (image reading apparatus) 3 of the exemplary embodiment, in the image reading chip 415, the capacitor 114 which is connected in parallel to the amplification unit 112 is configured as capacitor between the first comb-tooth shaped portion W1a provided in the first wire W1 and the second comb-tooth shaped portion W2a provided in the second wire W2. Thus, it is possible to realize the capacitor 114 with a small area. Thus, the capacitor 114 is easily disposed so as to overlap a region in which various elements such as a MOS transistor or a resistor are formed, and it is very effective in reducing the size of the image reading chip 415.

According to the scanner unit (image reading apparatus) 3 of the exemplary embodiment, in the image reading chip 415, the capacitance value $C_f$ of the capacitor 114 which is connected in parallel to the amplification unit 112 is set to be a value of an order of femto Farad, and thus it is possible to reduce variation of the capacitance value of the feedback capacitance, occurring by the manufacturing variation due to the parasitic capacitance. Accordingly, it is possible to achieve improvement of the sensitivity and reduction of sensitivity variation.

In the exemplary embodiment, as illustrated in FIG. 11, in the amplification unit 112, the NMOS transistor MN1 and the NMOS transistor MN2 are cascode-connected. Even though the NMOS transistor MN2 is not provided, the amplification unit 112 functions as an inverting amplifier. However, in this case, parasitic capacitance between the gate and the drain of the NMOS transistor MN1 is capacitance between the input terminal IN and the output terminal OUT. That is, since the parasitic capacitance is parallel to the capacitor 114, the capacitance value of the feedback capacitance is more than $C_f$ by the capacitance value of the parasitic capacitance, and the sensitivity is deteriorated. On the contrary, in the exemplary embodiment, since the NMOS transistor MN1 and the NMOS transistor MN2 are cascode-connected, the parasitic capacitance between the gate and the drain of the NMOS transistor MN1 and the parasitic capacitance between gate and the drain of the NMOS transistor MN2 are also not capacitance between the input terminal IN and the output terminal OUT. Thus, regardless of the parasitic capacitance, the capacitance value of the feedback capacitance is capacitance value $C_f$ of the capacitor 114, and thus it is possible to suppress deterioration of the sensitivity due to the parasitic capacitance.

Further, the amplification unit 112 illustrated in FIG. 11 can increase the voltage amplification rate G to be equal to or more than 1000 times, and accuracy of the approximation expression of Expression (3) is improved as the voltage amplification rate G is increased. Thus, it is possible to improve linearity of the output voltage Vs of the pixel circuit 110, and to reduce variation of the sensitivity in each of the pixel circuit 110.

7. Modification Example

The first wire W1 and the second wire W2 constituting the capacitor 114 are not limited to the configuration in FIG. 14, and may be set to be various configurations.

Figure 15:
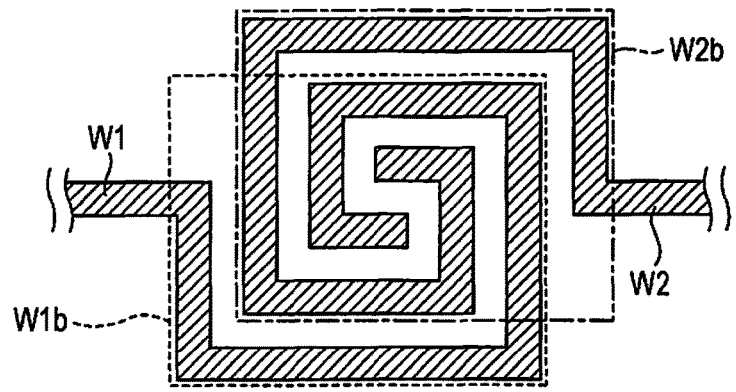
FIG. 15 is a diagram illustrating another example of the first wire and the second wire constituting capacitor.

FIG. 15 is a diagram illustrating another example of the first wire W1 and the second wire W2 constituting the capacitor 114. Similar to FIG. 14, FIG. 15 illustrates only a portion constituting the capacitor 114 when the semiconductor substrate of the image reading chip 415 is viewed in plan.

In FIG. 15, the first wire W1 has a first spiral shaped portion W1b, and the second wire W2 has a second spiral shaped portion W2b. The First spiral shaped portion W1b and the second spiral shaped portion W2b are provided so as to mesh with each other. At this time, the capacitor 114 corresponds to capacitance between the first spiral shaped portion W1b and the second spiral shaped portion W2b. It is not possible to set a gap between the first spiral shaped portion W1b and the second spiral shaped portion W2b to be smaller than the minimum gap defined in the design rule. However, because an area of portions at which the first spiral shaped portion W1b and the second spiral shaped portion W2b face each other is large, it is possible to realize the capacitance value $C_f$ in an order of femto Farad with a small area. Further, if wiring having such a small area is provided, it is possible to perform disposition so as to overlap a region in which a MOS transistor is formed when viewed in a plan of the semiconductor substrate, in a metallic layer higher than a polysilicon layer in which the gate of the MOS transistor is formed, and it is possible to reduce the chip size of the image reading chip 415.

Figure 16:
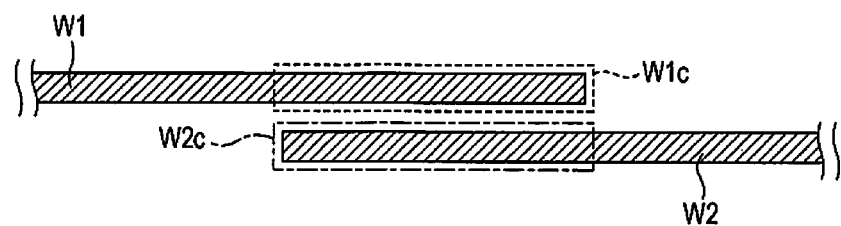
FIG. 16 is a diagram illustrating still another example of the first wire and the second wire constituting capacitor.

FIG. 16 is a diagram illustrating still another example of the first wire W1 and the second wire W2 constituting the capacitor 114. Similar to FIG. 14, FIG. 16 illustrates only a portion constituting the capacitor 114 when the semiconductor substrate of the image reading chip 415 is viewed in plan.

In FIG. 16, the first wire W1 has a first linearly-shaped portion W1c facing the second wire W2. The second wire W2 has a second linearly-shaped portion W2c facing the first wire W1. At this time, the capacitor 114 corresponds to capacitance between the first linearly-shaped portion W1c and the second linearly-shaped portion W2c. In FIG. 16, it is not possible to set a gap between the first linearly-shaped portion W1c and the second linearly-shaped portion W2c to be smaller than the minimum gap defined in the design rule. However, an area of portions at which the first linearly-shaped portion W1c and the second linearly-shaped portion W2c face each other is increased, and thus it is possible to realize the capacitance value $C_f$ in an order of femto Farad with a small area. Fining in the manufacturing process is in progress. If the minimum gap between metallic wires, which is defined in the design rule, is reduced more, it is also possible to realize the capacitance value $C_f$ in an order of femto Farad with a small area.

Figure 17:
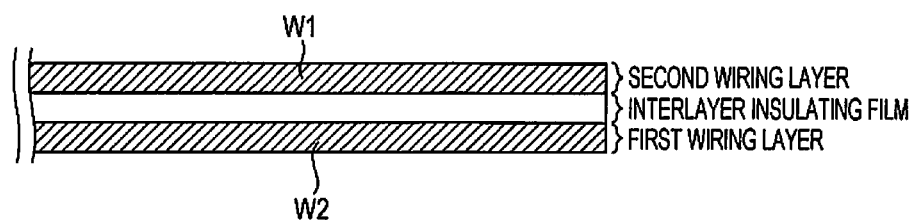
FIG. 17 is a diagram illustrating still another example of the first wire and the second wire constituting capacitor.

In the exemplary embodiment and the modification example, the first wire W1 and the second wire W2 constituting the capacitor 114 are provided in the same wiring layer. However, for example, as illustrated in FIG. 17, the first wire W1 and the second wire W2 may be provided in wiring layers different from each other. In FIG. 17, the first wire W1 is provided in a first wiring layer, and the second wire W2 is provided in a second wiring layer higher than the first wiring layer. The capacitor 114 is configured by the first wire W1, the second wire W2, and an interlayer insulating film between the first wire W1 and the second wire W2. The second wire W2 may be provided in the first wiring layer, and the first wire W1 may be provided in the second wiring layer higher than the first wiring layer.

Hitherto, the exemplary embodiment or the modification examples are described. However, the invention is not limited to the exemplary embodiment or the modification examples, and may be implemented in various forms in the scope without departing from the gist of the invention. For example, the exemplary embodiment and the modification examples may be appropriately combined.

The invention includes substantially the same configuration (for example, configuration having the same function, the same method, and the same result, or configuration having the same purpose and the same effect) as the configuration described in the exemplary embodiment. The invention includes a configuration obtained by substituting portions which are not essential in the configuration described in the exemplary embodiment. The invention includes a configuration which can have the same advantage as that of the configuration described in the exemplary embodiment, and may achieve the same purpose as that of the configuration. The invention includes a configuration obtained by adding a known technology to the configuration described in the exemplary embodiment.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image reading apparatus for reading an image, the apparatus comprising:
   a light receiving element configured to receive light from the image so as to perform photoelectric conversion;
   an amplification unit which is electrically connected to the light receiving element, and configured to amplify a signal generated by the photoelectric conversion;
   a switch element which is electrically connected to both first and second ends of the amplification unit so as to be in parallel with the amplification unit; and
   a capacitor which is electrically connected to both of the first and second ends of the amplification unit so as to be in parallel with to the amplification unit, the capacitor including a first wire and a second wire, the first wire electrically connecting a first end of the light receiving element, the first end of the amplification unit, and a first end of the switch element, the second wire electrically connecting the second end of the amplification unit and a second end of the switch element,
   the capacitor including capacitance, the capacitance being interconnect capacitance between the first wire and the second wire.

2. The image reading apparatus according to claim 1, wherein
   the first wire and the second wire constituting the capacitor are disposed in the same wiring layer among a plurality of wiring layers disposed on a semiconductor substrate.

3. The image reading apparatus according to claim 1, wherein
   the first wire has a first comb-tooth shaped portion,
   the second wire has a second comb-tooth shaped portion,
   the first comb-tooth shaped portion and the second comb-tooth shaped portion are arranged so as to mesh with each other, and
   the capacitor includes the capacitance between the first comb-tooth shaped portion and the second comb-tooth shaped portion.

4. The image reading apparatus according to claim 1, wherein
   a value of the capacitance is an order of femto Farad.

5. The image reading apparatus according to claim 1, wherein
   a value of the capacitance is more than a value of parasitic capacitance between the first wire and the second wire.

6. The image reading apparatus according to claim 1, wherein
   the amplification unit includes an output terminal, a first transistor to which a signal generated by the photoelectric conversion is configured to be input, and a second transistor which electrically connects the first transistor and the output terminal, and the first transistor and the second transistor are cascode-connected.

7. A semiconductor device comprising:
a light receiving element configured to receive light so as to perform photoelectric conversion;
an amplification unit which is electrically connected to the light receiving element, and is configured to amplify a signal generated by the photoelectric conversion;
a switch element which is electrically connected to both first and second ends of the amplification unit so as to be in parallel with the amplification unit; and
a capacitor which is electrically connected to both of the first and second ends of the amplification unit so as to be in parallel with the amplification unit, the capacitor including a first wire and a second wire, the first wire electrically connecting a first end of the light receiving element, the first end of the amplification unit, and a first end of the switch element, the second wire electrically connecting the second end of the amplification unit and a second end of the switch element,
the capacitor including capacitance, the capacitance being interconnect capacitance between the first wire and the second wire.

8. An image reading apparatus for reading an image, the apparatus comprising:
a light receiving element configured to receive light from the image so as to perform photoelectric conversion;
an amplification unit which is electrically connected to the light receiving element, and configured to amplify a signal generated by the photoelectric conversion;
a switch element which is electrically connected to both first and second ends of the amplification unit so as to be in parallel with the amplification unit;
a first wire electrically connecting a first end of the light receiving element, the first end of the amplification unit, and a first end of the switch element, the first wire having a first comb-tooth shaped portion; and
a second wire disposed in the same layer in which a first wire is disposed and electrically connecting the second end of the amplification unit and a second end of the switch element, the second wire having a second comb-tooth shaped portion,
the first comb-tooth shaped portion and the second comb-tooth shaped portion being arranged so as to mesh with each other.

9. The image reading apparatus according to claim 1, wherein
a value of the capacitance is equal to or more than 1 fF and less than 10 fF.

* * * * *